(12) United States Patent
van Veen et al.

(10) Patent No.: US 6,280,502 B1
(45) Date of Patent: Aug. 28, 2001

(54) REMOVING SOLIDS FROM A FLUID

(75) Inventors: J. W. H. M. van Veen, Amsterdam; Marco Betting, Rijswijk, both of (NL)

(73) Assignee: Shell Oil Company, Houston, TX (US)

( * ) Notice: Subject to any disclaimer, the term of this patent is extended or adjusted under 35 U.S.C. 154(b) by 0 days.

(21) Appl. No.: 09/223,886

(22) Filed: Dec. 31, 1998

(51) Int. Cl.⁷ .............................. B01D 5/00; B01D 53/24; B01D 45/12
(52) U.S. Cl. ..................... 95/29; 95/32; 95/34; 95/269; 96/389; 55/396; 55/448; 55/449; 55/456
(58) Field of Search .................................. 95/29, 32, 34, 95/269; 96/389; 55/396, 419, 448, 449, 456

(56) References Cited

U.S. PATENT DOCUMENTS

| | | |
|---|---|---|
| 3,185,181 | 5/1965 | Demyan . |
| 3,544,170 | 12/1970 | Bowles . |
| 3,559,373 | 2/1971 | Garrett . |
| 3,616,596 | 11/1971 | Campargue . |
| 3,626,665 | 12/1971 | Fenn et al. . |
| 3,725,271 | 4/1973 | Giannotti . |
| 3,892,070 | 7/1975 | Bose . |
| 3,894,851 | 7/1975 | Gorman . |
| 4,148,735 | 4/1979 | Laval, Jr. . |
| 4,292,050 | 9/1981 | Linhardt et al. . |
| 4,541,845 | 9/1985 | Michel-Kim . |
| 5,073,177 | 12/1991 | Brouwers . |
| 5,183,481 | 2/1993 | Felder . |
| 5,261,242 | 11/1993 | Lardinois . |
| 5,306,330 | 4/1994 | Nasikas . |

FOREIGN PATENT DOCUMENTS

| | | | |
|---|---|---|---|
| 496128 | * | 7/1992 | (EP) . |
| 1103130 | | 2/1968 | (GB) . |
| 2037610 A | | 7/1980 | (GB) . |
| 2-017921 | * | 11/1970 | (JP) . |
| 1-315306 | * | 12/1989 | (JP) . |
| 8901841A | | 2/1991 | (NL) . |
| 593717 | | 2/1976 | (SU) . |
| 1768242 A1 | | 10/1992 | (SU) .............................. B01D/45/12 |
| 1798009 | * | 2/1993 | (SU) . |
| 923491 | | 10/1963 | (WO) . |

OTHER PUBLICATIONS

C. A. Tjeenk Willink. *Extraction of Condensables From Gases in a Wellbore*, U.S. Pattent application Ser. No. 09/223,885, filed Dec. 31, 1998 (Attorney Docekt No. TH–1456).

C. A. Tjeenk Willink, *Dehydration of Gases at a Wellhead*, U.S. Patent application Ser. No. 09/223,887, filed Dec. 31, 1998 (Attorney Docekt No. TH–1457).

* cited by examiner

Primary Examiner—Thomas M. Lithgow

(57) ABSTRACT

A method and apparatus are provided for removing solid particles from a particle containing stream of fluid, the method including the steps of: inducing the stream to flow at supersonic velocity through a conduit; inducing a swirling motion to the supersonic stream of fluid thereby causing the particles to flow to a radially outer section of a collecting zone in the stream; and extracting the solid particles into an outlet stream from the radially outer section of the collecting zone. The apparatus is an apparatus effective for performance of this method.

5 Claims, 3 Drawing Sheets

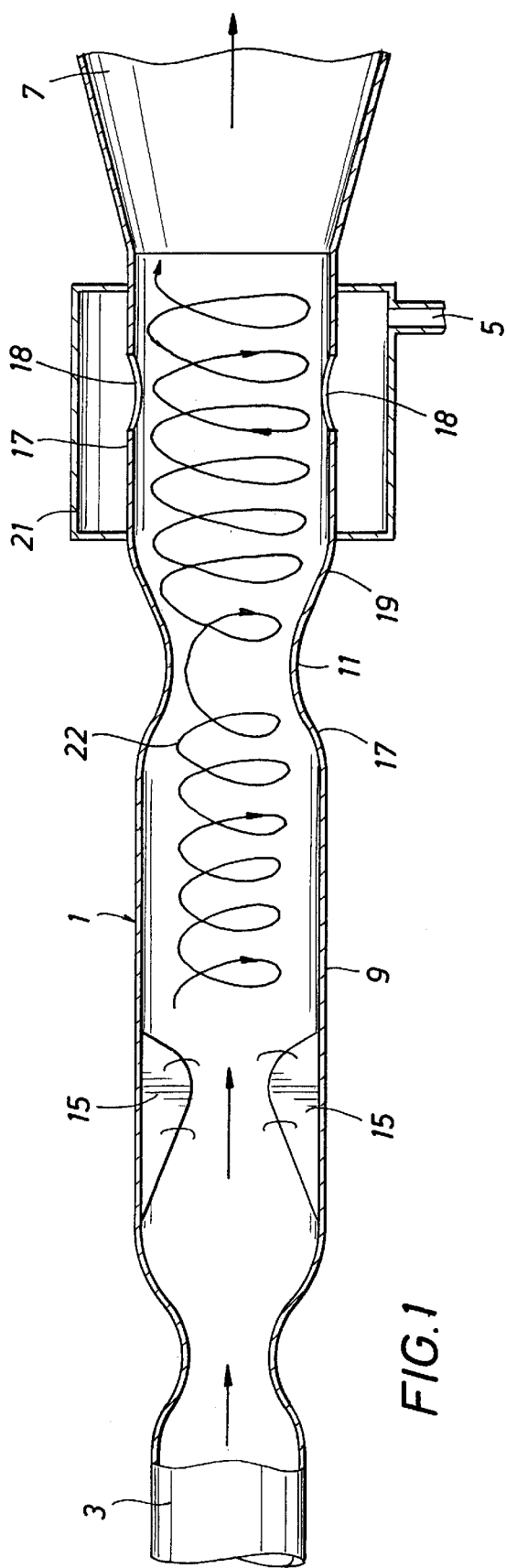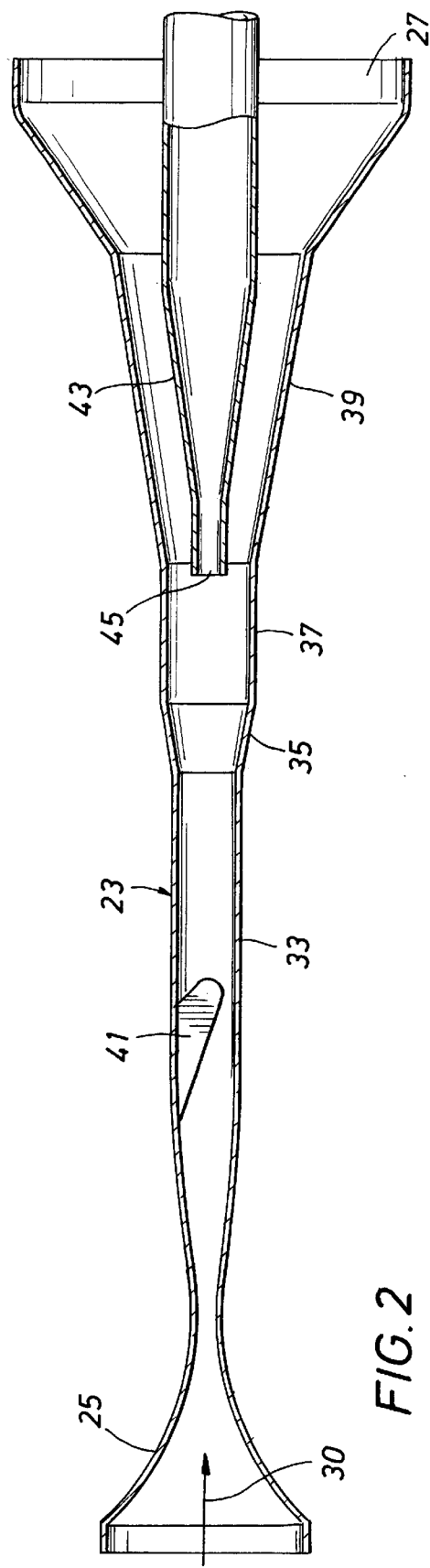

REMOVING SOLIDS FROM A FLUID

FIELD OF THE INVENTION

The present invention relates to removing solids from a fluid.

BACKGROUND TO THE INVENTION

Centrifugal force is useful for separation of solids from streams of fluids. Such separation can find application in various industrial processes, for example in removing of catalyst particles in fluidized bed catalytic cracking operations, and separation of ash from flue gases.

Fluids, when rotating around a central axis, will be accelerating toward the central axis, and inertia of the solids will force the solids outward away from the central axis. Outward flow of particles will be against the flow of fluids. Fluids containing fewer solids are then typically withdrawn from the center axis of rotation, and the solids are removed from the radially outer surface of the separator. The rate of flow of solids outward is limited by the resistance of the fluid. This rate is dictated by Stokes Law. Practically, only about five micron sized particles can be separated by conventional cyclone separators.

U.S. Pat. No. 5,073,177 suggests an apparatus for cyclonic separation of solids from a gas stream. This apparatus includes a rotating element of a large number of small conduits so that the particles in each small conduit only travel a short distance before contacting a surface, on which the particles will agglomerate. The element is said to rotate at 3000 rpm, to maximize the centrifugal force acting upon the particles being separated. The speed of rotation of the particles is limited to the speed at which the element can be rotated. This high rotational speed results in a relatively high maintenance apparatus. It is desirable to have a greater rotational speed imparted to the fluids without a rotating element that rotates at a high speed.

Dutch patent application No. 8901841 discloses a method of removing a selected gaseous component from a stream of fluid containing a plurality of gaseous components, wherein the stream is induced to flow at a supersonic velocity through a conduit so as to decrease the temperature of the fluid in the conduit to below a temperature at which the selected component condenses. The conduit is provided with swirl imparting means to impart a swirling motion to the stream of fluid flowing at supersonic velocity. The condensed particles are extracted in a first outlet stream from a radially outer section of the stream and the remaining fluid is collected in a second outlet stream from a central part of the stream. The velocity in the radially outer section and in the central part of the stream is supersonic.

In an embodiment of the device for separating a gas from a gas mixture as disclosed in NL-8901841, separate shock waves occur in the first and second outlet streams, leading to a relatively large flow resistance of the fluid. Furthermore, the separation efficiency is relatively low so that substantial amounts of the condensed particles are still present in the second outlet stream. This reference does not suggest utilizing such an apparatus for separation of solids from fluids.

SUMMARY OF THE INVENTION

In accordance with the invention there is provided a method and apparatus for removing particles from a particle containing fluid, the method including the steps of: inducing the stream to flow at supersonic velocity through a conduit; inducing a swirling motion to the supersonic stream of fluid thereby causing the particles to flow to a radially outer section of a collecting zone in the stream; and extracting the particles into an outlet stream from the radial outer section of the collecting zone. The apparatus is an apparatus effective for performance of this method.

Creation of the swirl in a fluid stream of sonic velocity results in considerably greater G-forces than are typically created in cyclone separtors.

In a preferred embodiment of the present invention, a shock wave caused by transition from supersonic to subsonic flow occurs upstream of the separation of the solids from the collecting zone. It was found that the separation efficiency is significantly improved if collection of the particles in the collecting zone takes place after the shock wave, i.e. in subsonic flow rather than in supersonic flow. This is because the shock wave dissipates a substantial amount of kinetic energy of the stream and thereby strongly reduces the axial component of the fluid velocity while the tangential component (caused by the swirl imparting means) remains substantially unchanged. As a result the density of the particles in the radial outer section of the collecting zone is significantly higher than elsewhere in the conduit where the flow is supersonic. It is believed that this effect is caused by the strongly reduced axial fluid velocity and thereby a reduced tendency of the particles to be entrained by a central "core" of the stream where the fluid flows at a higher axial velocity than nearer the wall of the conduit. Thus, in the subsonic flow regime the centrifugal forces acting on the condensed particles are not to a great extent counteracted by the entraining action of the central "core" of the stream, so that the particles are allowed to agglomerate in the radially outer section of the collecting zone from which they are extracted.

Preferably the shock wave is created by inducing the stream of fluid to flow through a diffuser. A suitable diffuser is a supersonic diffuser. A diffuser may be, for example, a diverging volume, or a converging and then diverging volume.

In an advantageous embodiment, the collecting zone is located adjacent the outlet end of the diffuser.

The present invention may be practiced in combination with other operations to effect drying of the fluid stream, or may be practiced in front of conventional separators in order to reduce the capacity and size required of those separators. Also, either of the stream containing the particles from the collecting zone or the stream from which the particles have been separated could be subjected to an additional separation step, for example, a dryer or separator.

The supersonic flow of the present invention also causes a rapid expansion, resulting in cooling of a compressible fluid stream. This cooling results in condensation of vapors to the extent that such cooling brings the temperature of the stream to a temperature below a dew point of the fluid stream. Creation of this liquid can improve separation of solids from the fluids by providing surfaces to which the solids can agglomerate, resulting in larger particles that are more easily separated.

Advantageously, any gaseous fraction separated from the radial outer section of the collecting zone can be recycled back to the inlet, preferably using an inductor to increase the pressure back to the pressure of the inlet stream.

Suitably the means for inducing the stream to flow at supersonic velocity comprises a Laval-type inlet of the conduit, wherein the smallest cross-sectional flow area of the diffuser is larger than the smallest cross-sectional flow area of the Laval-type inlet.

BRIEF DESCRIPTION OF THE FIGURES

FIG. 1 shows schematically a longitudinal cross-section of a first embodiment of the device according to the invention.

FIG. 2 shows schematically a longitudinal cross-section of a second embodiment of the device according to the invention.

DESCRIPTION OF A PREFERRED EMBODIMENT

Figure 3:
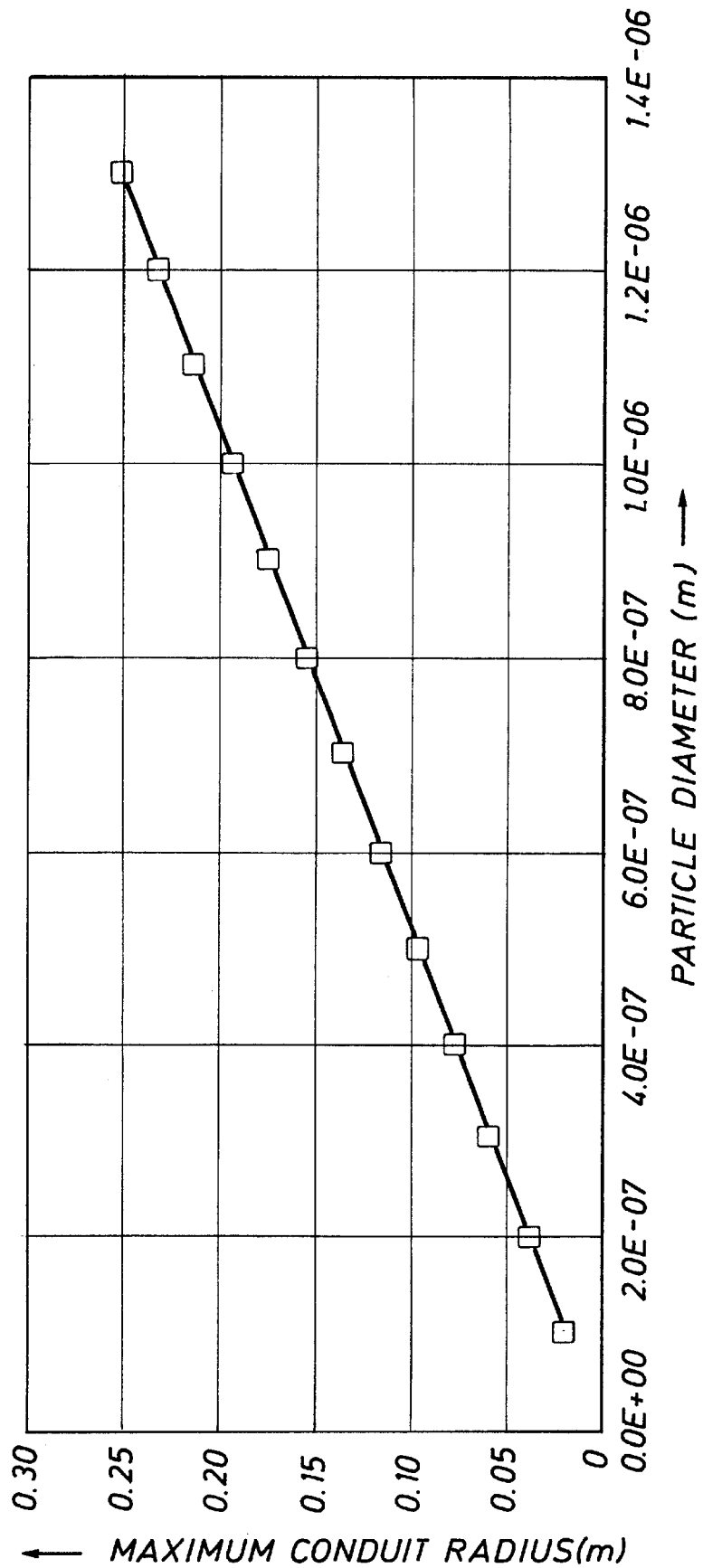
FIG. 3 is a plot of particle size vs. equilibrium diameter for a selected set of conditions.

Copending U.S. patent applications (Docket No. TH-1453)and (Docket no. TH-1454), both incorporated herein by reference, disclose various embodiments and variations of the present invention applied to separation of gas streams into a stream of condensables and a stream of noncondensable gas. The present invention may be utilized either with such removal of condensables along with solids, or without removal of condensables. In the disclosure of (TH-1454) a long expansion, leading to a relatively slower decrease of temperature as a function of time (dT/dt—in the order of less than 100,000° K/second) is taught in order to form larger drops of condensable fluids. The larger drops are then more readily separated. As applied to the present invention, in an application wherein liquids are formed (for example, for separation of liquids along with the solids, or to improve the separation of solids by providing droplets to which the solids agglomerate) application of the lower dT/dt may be advantageous. If condensable gases are present but not to be separated, either the dT/dt of the apparatus could be high, by using a conventional short Lavel nozzle rather than a long slender Laval nozzle, and therefore only forming liquids that will not be separated by the apparatus, or removal of the solids laden gases from the radial outer section of the collecting zone could be sufficiently long after the shock wave that the condensables have reverted back to vapor due to the reheating upon recompression.

In FIG. 1 is shown a conduit in the form of an open-ended tubular housing 1 having a fluid inlet 3 at one end of the housing, a first outlet 5 for solids laden fluid near the other end of the housing, and a second outlet 7 for substantially solids-free fluid at the other end of the housing. The flow-direction in the device 1 is from the inlet 3 to the first and second outlets 5, 7. The inlet 3 is an acceleration section containing a Laval-type, having a longitudinal cross-section of converging—diverging shape in the flow direction so as to induce a supersonic flow velocity to a fluid stream which is to flow into the housing via said inlet 3. The housing 1 is further provided with a primary cylindrical part 9 and a diffuser 11 whereby the primary cylindrical part 9 is located between the inlet 3 and the diffuser 11. One or more (for example, four) delta-shaped wings 15 project radially inward from the inner surface of the primary cylindrical part 9, each wing 15 being arranged at a selected angle to the flow-direction in the housing so as to impart a swirling motion to fluid flowing at supersonic velocity through the primary cylindrical part 9 of the housing 1.

The wings are preferably provided with a very sharp leading edge, most preferably razor sharp. At high velocities, a blunt edge can cause shock waves in front of the wing. This shock wave can decrease the lift forces dramatically. Because the energy imparted to the swirling motion is directly proportional to the lift force of the wing, it is preferred that this edge be sharp. The wing is also relatively flat, with a thickness preferably no more than about four millimeters at the base of the wing.

The diffuser 11 is shown with a longitudinal section of converging—diverging shape in the flow direction, defining a diffuser inlet 17 and a diffuser outlet 19. The smallest cross-sectional flow area of the diffuser is larger than the smallest cross-sectional flow area of the Laval-type inlet 3.

The housing 1 further includes a secondary cylindrical part 17 having a larger flow area than the primary cylindrical part 9 and being arranged downstream the diffuser 11 in the form of a continuation of the diffuser 11. The secondary cylindrical part 17 is provided with longitudinal outlet slits 18 for liquid and/or solids, which slits 18 are arranged at a suitable distance from the diffuser outlet 19.

A outlet chamber 21 encloses the secondary cylindrical part 17, and is provided with the aforementioned first outlet 5 for a stream of concentrated solid particles.

The secondary cylindrical part 17 debouches into the aforementioned second outlet 7 for substantially gas.

Normal operation of the device 1 is now explained.

A stream containing micron-sized solid particles is introduced into the Laval-type inlet 3. As the stream flows through the inlet 3, the stream is accelerated to supersonic velocity. As a result of the strongly increasing velocity of the stream, the temperature of the stream may decrease to below the condensation point of heavier gaseous components of the stream (for example, water vapors) which thereby condense to form a plurality of liquid particles. As the stream flows along the delta-shaped wings 15 a swirling motion is imparted to the stream (schematically indicated by spiral 22) so that the liquid particles become subjected to radial outward centrifugal forces. When the stream enters the diffuser 11 a shock wave is created near the downstream outlet 19 of the diffuser 11. The shock wave dissipates a substantial amount of kinetic energy of the stream, whereby mainly the axial component of the fluid velocity is decreased. As a result of the strongly decreased axial component of the fluid velocity, the central part of the stream (or "core") flows at a reduced axial velocity so that there is a reduced tendency of the solids and condensed particles to be entrained by the central part of the stream flowing inside the secondary cylindrical part 17. The condensed particles can therefore agglomerate in a radial outer section of a collecting zone of the stream outside the secondary cylindrical part 17. The agglomerated particles form a layer of liquid and/or solids which is extracted from the collecting zone via the outlet slits 18, the outlet chamber 21, and the first outlet 5 for substantially liquid.

The stream from which particles have been removed (including any condensed vapors) is discharged through the second outlet 7 for substantially solids-free gas.

In FIG. 2 is shown a second embodiment of the device for carrying out the invention, the device having an open-ended tubular housing 23 with a Laval-type fluid inlet 25 at one end and a first outlet 27 for stream containing the solids and any condensed liquid at the other end of the housing. The flow-direction for fluid in the device is indicated by arrow 30. The housing has, from the inlet 25 to the liquid outlet 27, a primary substantially cylindrical part 33, a diverging diffuser 35, a secondary cylindrical part 37 and a diverging part 39. A delta-shaped wing 41 projects radially inward in the primary cylindrical part 33, the wing 37 being arranged at a selected angle to the flow-direction in the housing so as to impart a swirling motion to fluid flowing at supersonic velocity through the housing 23. A tube-shaped second outlet 43 for substantially gas extends through the first outlet 27 coaxially into the housing, and has an inlet opening 45 at the downstream end of the secondary cylindrical part 37. The outlet 43 is internally provided with a straightener (not shown), e.g. a vane-type straightener, for transferring swirling flow of the gas into straight flow.

The delta-shaped wing is preferably a triangular profile shape, with a leading edge that is sloped to a wing tip so that the leading edge is "subsonic", meaning that a "mach" line extending from the base of the wing is at greater angle from the cord of the wing at the base than the leading edge of the wing. The trailing edge is preferably also subsonic. The wing preferably extends across the vortex tube or conduit for about two thirds of the diameter.

Normal operation of the second embodiment is substantially similar to normal operation of the first embodiment, i.e. supersonic swirling flow occurs in the primary cylindrical part 33, the shock wave occurs near the transition of the diffuser 35 to the secondary cylindrical part 37, subsonic flow occurs in the secondary cylindrical part 37, the stream containing the solid particles and any condensed liquids is discharged through the first outlet 27, and the dried gas is discharged through the second outlet 43 in which the swirling flow of the gas is transferred into straight flow by the straightener.

In the above detailed description, the housing, the primary cylindrical part, the diffuser and the secondary cylindrical part have a circular cross-section. However, any other suitable cross-section of each one of these items can be selected. Also, the primary and secondary parts can alternatively have a shape other than cylindrical, for example a frusto-conical shape. Furthermore, the diffuser can have any other suitable shape, for example without a converging part (as shown in FIG. 2) especially for applications at lower supersonic fluid velocities.

Instead of each wing being arranged at a fixed angle relative to the axial direction of the housing, the wing can be arranged at an increasing angle in the direction of flow, preferably in combination with a spiraling shape of the wing. A similar result can be obtained by arranging flat wings along a path of increasing angle with respect to the axis of initial flow.

Furthermore, each wing can be provided with a raised wing-tip (also referred to as a winglet).

Instead of the diffuser having a diverging shape (FIG. 2), the diffuser alternatively has a diverging section followed by a converging section when seen in the flow direction. An advantage of such diverging—converging shaped diffuser is that less fluid temperature increase occurs in the diffuser.

To increase the size of the condensed particles, the boundary layer in the supersonic part of the stream can be thickened by, for example, injecting a gas into the supersonic part of the stream. The gas can be injected, for example, into the primary cylindrical part of the housing via one or more openings provided in the wall of the housing. Suitably part of the gas from the first outlet is used for this purpose. The effect of such gas-injection is that less condensed particles form in the supersonic part of the stream resulting in larger particles and better agglomeration of the larger particles.

The swirl imparting means can be arranged at the inlet part of the conduit, instead of downstream the inlet part.

EXAMPLE

A test apparatus for the present invention was prepared, and demonstrated for separating water vapor from air at ambient conditions. This apparatus and exemplary tests are described below, and this example along with application of Stokes law would demonstrate the application of the present invention as applied to separation of particles from a gas stream, either along with separation of condensable gases or without separation of condensable gases.

Figure 4:
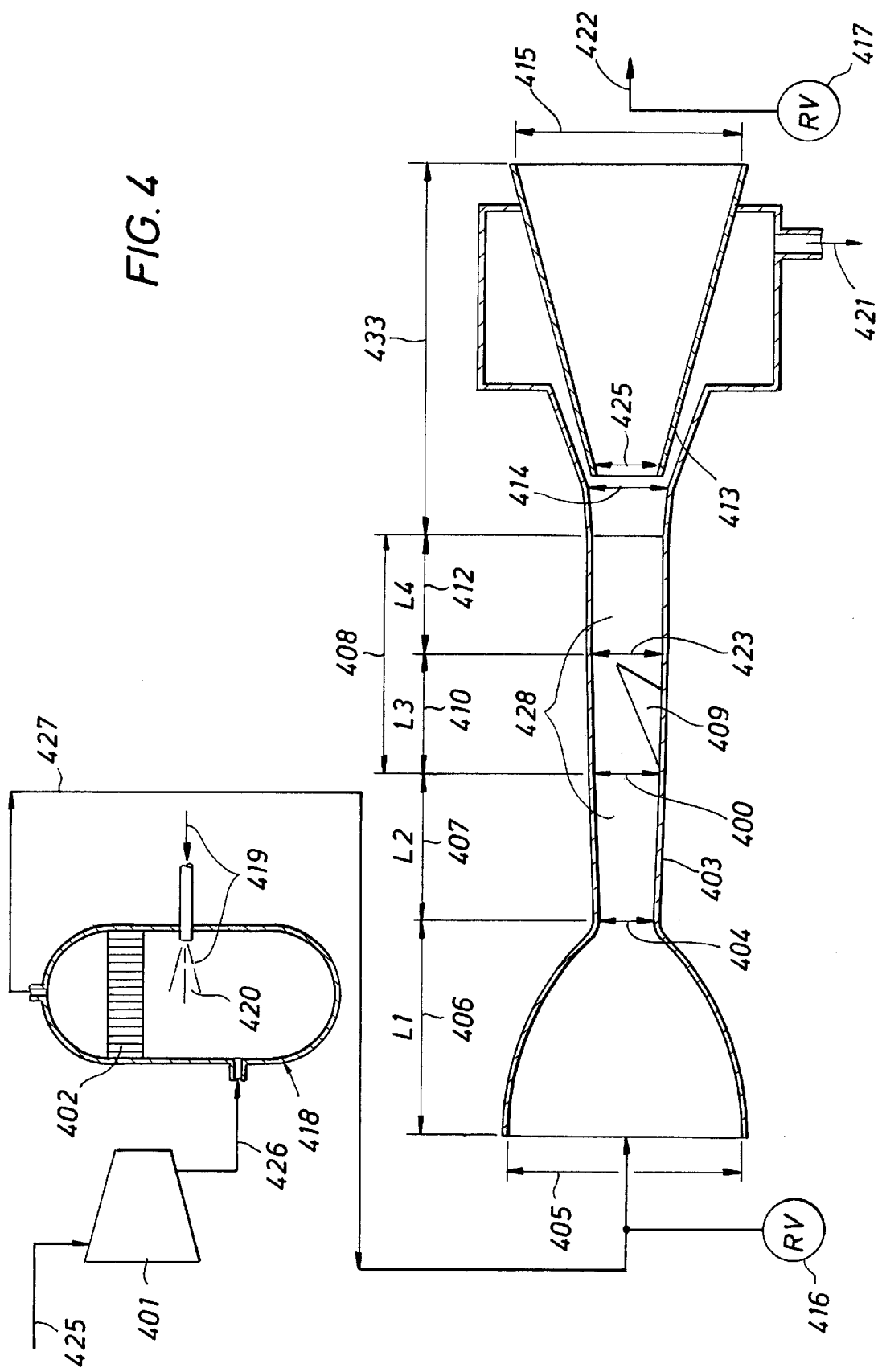
FIG. 4 is a schematic figure of a particular embodiment of the present invention.

A test apparatus for the present invention was prepared, and demonstrated for separating water vapor from air at ambient conditions. FIG. 4 is referred to for the general configuration of the apparatus used.

In this example the air 425 is pressurized to 1.4 bar(abs.) by means of a blower 401 to provide pressurized air 426. After the blower the air is cooled to about 25 to 30° C. by fin cooler 402, located in a vessel 418, and water 419 is sprayed into the vapor space below the cooler 420 to ensure that the air is near water saturation (RV=90%). This water saturated air 427 is fed to the feed liquid-vapor separator 403 where the water is separated with a small amount of slip air into a wet stream 421, coming along with this water liquid stream and dried air 422.

In this example, the apparatus is provided with tubular flow ducts although the same results can be achieved for rectangular or asymmetric duct cross sections. Therefore diameters of devices are mentioned and always refer to the inner diameter.

The typical inlet conditions are summarized below:
1. Mass flow rate: 1.2 kg/s
2. Inlet pressure: 1400 mbar(abs)
3. Inlet temperature: 25° C.
4. Inlet humidity: 90%

The device condenses water vapor, resulting in a mist flow containing large number of water droplets, typically $10^{13}/m^3$, of which the mean droplet diameter was measured as being 0.9 microns. Therefore the final temperature (T) and pressure (P) at the outlet of the Laval nozzle and through the supersonic region have to be determined such that the water vapor fraction becomes negligible small. In this case it will be T=−28° C. and P=680 mbar(abs.) in the supersonic zone 428.

The nozzle throat cross-section is sized in order to obtain the required flow rate. Considering the inlet conditions required to result in sufficient separation of condensable, this throat diameter 404 is 70 mm. The inlet diameter 405 is 300 mm, although its value is not significant with respect to the working of the apparatus. The nozzle outlet diameter 400 is 80 mm in order to obtain supersonic flow conditions; typically the corresponding Mach number, M=1.15.

The lengths of the nozzle are determined by the cooling speed, which for this case is 19000 K/s. Persons of ordinary skill in the art can determine pressure and temperature profiles for the flow through the apparatus, and thus the cooling rate. The cooling speed determines the droplet size distribution. Lowering the value of the cooling speed results in larger average droplet sizes. Length of the nozzle is:

| | |
|---|---|
| L1, 406 | 700 mm from nozzle inlet to nozzle throat |
| L2, 407 | 800 mm from nozzle throat to nozzle outlet |

In order to decrease frictional losses the wall roughness is small, preferably 1 micron or less.

Depending on the application any rigid material can be used for the nozzle device, as long as the before mentioned design parameters are respected.

The vortex tube 408 is connected between the nozzle outlet and the diffuser. In the vortex tube a wing-like, swirl imparting internal 409 is present. At the edge of this internal a vortex is created on the upper (low-pressure) side and shed from the plane, preferably at the trailing edge. The root cord of this wing-like plate is attached to the inner wall of the vortex tube.

The sizing of the vortex tube is related to the nozzle outlet diameter, which is the inlet diameter of the vortex tube 400 is 80 mm. In this case vortex tube is slightly conical; the diameter is increasing linear to 84 mm (423) over a length of approximately the cord length of the wing.

After the conical section of the vortex tube 410, the vortex tube diameter is constantly 84 mm over a length were the droplets will be depositing on the inner wall (separation length). These two lengths are:

| | |
|---|---|
| L3, 410 | 300 mm from wing apex to wing trailing edge |
| L4, 412 | 300 mm from wing trailing edge to diffuser |

The sizing of the wing internal depends on the preferred circulation or integral vorticity. This circulation is typical 16 $m^2/s$ resulting from a wing cord length of 300 mm, a wing span at the trailing edge is 60 mm and at an incidence of the wing cord at the axis of the tube of 8°. The sweepback angle of the leading edge (from perpendicular to the flow) is 87° and the sweepback angle of the trailing edge is 40°. The edges of the wing are sharp. The plane of the wing is flat and its profile is extremely slender. The thickness of the wing is about 4 mm at the root. The wing is at an 8° angle to the axis of the tube.

In the drainage section withdrawal of liquids out of the vortex tube is achieved. The drainage section is not a sharp distinguished device but is an integral part of the vortex tube, by means of, for example, slits, porous materials, holes in the vortex tube walls; or, as shown in FIG. 4, is an integral part of the diffuser by means of a vortex finder 413 (co-axial duct). In this example, a vortex finder (co-axial duct) is placed centrally in the duct after the shock wave, which is present directly after the vortex tube in the first diffuser part 414.

The sizing of the vortex tube is dependent on the diameter ratio between diffuser diameter at that location 424 (90 mm at the inlet) and vortex finder inlet diameter at that point 425 (85 mm at the inlet). The cross-sectional area difference between the latter two determines the minimal flow, which is extracted from the main stream containing the liquids. In this case this minimal flow is 10% of the main flow i.e. 0.12 kg/s. The diffuser length 433 is 1500 mm.

In the diffuser the remaining kinetic energy in the flow is transformed to potential energy (increase of static pressure). It is desirable to avoid boundary layer separation, which can cause stall resulting in a low efficiency. Therefore the half divergence angle of the diffuser should be preferably less then 5° as in this case 4° is used. The diffuser inlet diameter is the same as the vortex finder inlet diameter (85 mm). The outlet diameter 415 of the diffuser is 300 mm, and the dry air at this point is at about atmospheric pressure. The performance of this apparatus was measured by two humidity sensors (capacitive principle: manufacturer 'Vaisala') one at the air inlet 416 and the other at the dried air outlet 417, both were corrected for temperature and pressure. The typical values of the inlet water fractions were 18–20 gram of water vapor per kg dry air. Typical values of the outlet water were 13–15 gram of water vapor per kg dry air. This can be expressed in separation efficiencies of about 25% of the water vapor in the inlet removed. This also corresponds to the separation of liquids condensed in the super sonic region, because most of the liquid water present in the inlet stream condenses at that point. This test apparatus was also used to separate milk powder from the inlet stream. The mean diameter of the milk powder particles was measured to be one micron and the particles were successfully separated from air.

Separation in the apparatus of the present invention is due to inertia forces of a dispersed liquid or solid phase transported in a gaseous fluid. A swirling motion of the fluid (vortex flow) imparts inertia forces in which the heavier constituent's i.e. liquid and/or solid particles, drifting in outer radial direction with respect to the gas streamlines.

Particle drift in gravitational or centrifugal fields is described by Stokes relationships, solving the momentum equations. In a vortex two counteracting phenomena—with respect to the forces acting on said particle—taking place known as: Vortex strength (Γ) and Sink strength (Q). The vortex strength (Γ) forces the particle to flow in tangential direction causing a centrifugal force acting on this particle so a positive radial drift of the particle results. The sink strength (Q) causes a radial inflow of gas to the vortex axis, resulting in a negative radial drift of the particle. For every vortex there exists a radial position for a particle in the vortex where the resulting force acting on the particle is zero. On this particular radial position—known as the equilibrium radius ($R_{eq}$)—the particle has no motion in radial direction anymore. When $R_{eq}$ exceeds the conduit radius ($R_{conduit}$) the droplet is deposited on the wall, which enables separation of liquids. From Stokes law it is known that:

$$R_{eq} = \frac{\Gamma}{\sqrt{Q}} \cdot \sqrt{2 \cdot \pi \cdot \frac{2}{9} \cdot \frac{d^2}{4 \cdot \pi^2 \cdot \nu} \cdot \left(\frac{\rho_L}{\rho_G} - 1\right)}$$

and:

$$Q=2\pi r V_{rad.}$$

$$\Gamma=2\pi r V_{tan.}$$

wherein:

r is the radius from the center of the vortex;

$V_{rad.}$ is the velocity radially toward the axis of rotation of the vortex; and $V_{tan.}$ is the tangential velocity of the fluid.

Separation is achieved when: $R_{eq} \geqq R_{conduit}$.

The sink strength Q is typically between about 1 and about 5 percent of the circulation in vortexes utilized in the present invention. Therefore:

$$Q=2\pi r V_{rad.} \approx (0.01)\Gamma=(0.01)2\pi r V_{tan.}$$

FIG. 3 shows the minimal $R_{conduit}$ as function of the particle diameter (d) for conditions of:

| | |
|---|---|
| Circulation | $\Gamma = 48.3\ m^2/s$ |
| Sink strength | $Q = 0.5\ m^2/s$ |
| Kinematic viscosity | $\nu = 1.5 \cdot 10^{-5}\ m^2/s$ |
| Gas density | $\rho_G = 0.3\ kg/m^3$ |
| Particle density | $\rho_L = 1000\ kg/m^3$ |

This figure shows that for a particle diameter of 1 micron the maximum allowable conduit radius should be equal to or less then 200 mm in order to get separation ($R_{eq} \geqq R_{conduit}$). From Stokes Law, it can be seen that solids having densities greater than the assumed particle density would have even larger $R_{eq,}$ resulting in even smaller particles being separated.

We claim:

1. A method for removing solid particles from a particle containing stream of fluid, the method comprising the steps of:
   inducing the stream to flow at supersonic velocity through a conduit;
   inducing a swirling motion to the supersonic stream of fluid thereby causing the particles to flow to a radially outer section of a collecting zone in the stream;
   creating a shock wave in the stream so as to decrease the axial velocity of the fluid to subsonic velocity: and
   extracting the solid particles into an outlet stream from the radially outer section of the collecting zone wherein extraction the particles into an outlet stream from the radially outer section of the collecting zone is downstream of the shock wave and downstream the location where the swirling motion is imparted.

2. The method of claim 1 wherein the shock wave is created by inducing the stream of fluid to flow through a diffuser.

3. The method of claim 1 wherein the outlet stream is introduced into a gas/solid separator to separate a gaseous fraction of the outlet stream from a solid portion thereof.

4. The method of claim 3, wherein said gaseous fraction is mixed with the stream of fluid induced to flow at supersonic velocity through the conduit.

5. The method of claim 1 wherein the stream of fluid further comprises components that condense from the fluid in the region of supersonic flow, and are separated from the stream in the outlet stream.

* * * * *